Patented Oct. 12, 1948

2,451,333

UNITED STATES PATENT OFFICE 2,451,333

SYNTHESIS OF POLYHYDROXY COMPOUNDS

William F. Gresham and Richard E. Brooks, Wilmington, Del., assignors to E. I. du Pont de Nemours & Company, Wilmington, Del., a corporation of Delaware No Drawing. Application April 28, 1945, Serial No. 590,960

5 Claims. (Cl. 260—635)

This invention relates to the synthesis of organic oxygen-containing compounds, and in particular to the synthesis of polyhydroxy compounds by reaction between formaldehyde, carbon monoxide and hydrogen.

On object of this invention is to provide a method for preparing polyhydroxy compounds from relatively inexpensive and readily available starting materials. Other objects will appear hereinafter.

It has been discovered in accordance with this invention that polyhydroxy compounds are produced by reaction between formaldehyde, carbon monoxide and hydrogen in the presence of hydrogenating catalysts. It is believed that no prior art exists pertaining to this method for the preparation of organic compounds.

While the mechanism of the reaction whereby polyhydroxy compounds are produced from formaldehyde, carbon monoxide and hydrogen is not fully understood, it is believed that the following equations represent the type of overall reaction which probably occurs.

(1) $\quad 2H_2 + CO + HCHO \rightarrow HOCH_2CH_2OH$ (2) $\quad 2H_2 + CO + 2HCHO \rightarrow HOCH_2CHOHCH_2OH$ 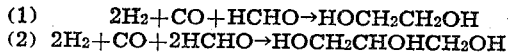

The reaction products obtained in accordance with the invention may be further treated with hydrogen in a subsequent step, if desired, whereby increased yields of hydroxy compounds boiling in the range of the lower glycols, and glycerine, are obtained. This subsequent hydrogenation may be conducted in the presence of a hydrogenation catalyst at superatmospheric pressure at a temperature of about 100° to 300° C.

The hydrogenation catalysts which may be employed in the practice of this invention include such materials as nickel, cobalt, manganese, iron, chromium, copper, platinum, molybdenum, palladium, zinc, cadmium, ruthenium, and compounds thereof, or combinations of these materials with each other or with inert supports such as kieselguhr, pumice, etc., or promoters such as $ThO_2$, Mn, etc. The amount of catalyst employed is generally about 0.1 to 10.0% based on the total weight of reaction mixture, although much smaller quantities of the more active catalysts are found to be effective. Among the best catalysts for use in this invention are cobalt-containing catalysts, such as metallic cobalt, reduced sintered cobalt oxide, cobalt carbonyl, cobalt salts and the like.

The reaction is preferably conducted by heating a mixture of formaldehyde, carbon monoxide and hydrogen in a suitable pressure-resistant vessel in the presence of one of the aforesaid catalysts. In general, superatmospheric pressures are employed, preferably pressures in excess of 100 atmospheres. Excellent results are obtained at pressures within the range of about 200 to 1500 atmospheres. The maximum pressure is determined by the strength of the retaining vessel and may be as high as 3000 atmospheres, or even higher. The reaction temperature is usually within the range of 80° to 300° C., preferably about 100° to 200° C.

The relative proportions of reactants initially present in the reaction mixture may be the stoichiometrically required quantities, although other proportions may be employed if desired. Excellent results are obtained with the molar ratio of $CO:H_2$ initially in the range of about 4:1 to about 1:10.

In one method of practicing the invention, formaldehyde and the catalyst are placed in a pressure-resistant vessel, along with a suitable solvent or other inert reaction medium, and a mixture of carbon monoxide and hydrogen is injected under very high pressure. After the reaction is complete, the resulting product is removed from the reaction vessel, and the polyhydroxy compounds produced by the reaction are separated from the mixture by any suitable method, such as by fractional distillation.

The formaldehyde which is employed as a reactant in the practice of the invention may be in any available form, such as paraformaldehyde, monomeric formaldehyde, formaldehyde-yielding compounds including N-methylol derivatives, reactive formals, etc., or trioxane. Best results are generally obtained by the use of paraformaldehyde, in a suitable inert medium such as an aliphatic ether or ester.

The invention is illustrated further by means of the following examples.

*Example 1.*—A mixture containing 31.6 grams of paraformaldehyde, 123 cc. of methyl formate and 10 grams of reduced, sintered cobalt oxide catalyst was heated in a silver-lined shaker tube for two hours at a temperature of 150° to 157° C. under a pressure of 500 to 700 atmospheres of a gas consisting of 2 volumes of hydrogen per volume of carbon monoxide (hereinafter called $CO:2H_2$). Distillation of the resulting mixture gave 6.8 grams of mixed polyhydroxy compounds having a boiling point of from 58° to 3 mm. to 174° at 6 mm.

*Example 2.*—A mixture containing 31.6 grams of paraformaldehyde, 100 cc. of methyl formate and 20 grams of reduced, sintered, cobalt oxide catalyst was heated for 2 hours in a silver-lined shaker tube at a temperature of 155° to 164° C. under a pressure of 460 to 750 atmospheres of $CO:2H_2$. The resulting product was removed from the reaction vessel and was thereafter freed of methyl formate, hydrogenated in methanol solution in the presence of copper chromite catalyst at a temperature of 230° C. under a pressure of 745 to 750 atmospheres. The resulting product was distilled yielding 12 grams of a fraction which had a boiling point of 73°/6 mm. to 95° C./7 mm. Analysis of this fraction by the periodate method indicated that it contained 46% of ethylene glycol. A higher boiling fraction (weight, 5 grams), was collected at 107°/7 mm. to 165° C./7 mm. Periodate analysis indicated that this material contained 12.5% of glycerol.

Example 3.—A mixture containing 30.1 grams of trioxane, 100 cc. of distilled water and 10 grams of reduced, sintered cobalt oxide catalyst was heated in a silver-lined shaker tube for 75 minutes at a temperature of 160° to 192° C. under a pressure of 550 to 640 atmospheres of $CO:2H_2$. Distillation of the resulting product gave 7.3 grams of polyhydroxy compounds having a boiling point above 100° C.

Example 4.—A mixture containing 31.6 grams of paraformaldehyde, 100 cc. of methyl formate and 20 grams of reduced, sintered cobalt oxide catalyst was heated for one half hour at a temperature of 160° to 180° C. in a silver-lined shaker tube under autogenous pressure. Thereafter a gas consisting of $CO:4H_2$ was injected, and the heating was continued for two hours longer at a temperature of 158° to 162° C. under a pressure of 445 to 735 atmospheres. The resulting product was free of formaldehyde odor. Distillation of the mixture gave a syrupy residue, boiling above 75° C. at 94 mm., which had the following analysis: carbonyl number, 481.8; % $H_2O$, 8.5; acid number, 161.7; saponification number, 343.7; ester number, 182.0; hydroxyl number, 309.7.

The above examples are illustrative only and are not intended to limit the invention. While in the examples the invention is illustrated by means of a batchwise operation, it is to be understood that the invention may also be practiced in a continuous manner. It is generally convenient to employ a solvent for the reactants, but this is not absolutely necessary. The catalyst may be either fixed, or dispersed in the reaction mixture. Soluble hydrogenation catalysts may be employed if desired.

The products obtained in accordance with this invention are widely useful as glycerin substitutes, and as intermediates for the manufacture of other materials such as alcohols, glycol esters, etc.

Since many embodiments of the invention may be made without departing from the spirit and scope thereof, it will be understood that we do not limit ourselves except as set forth in the following claims.

We claim:

1. A process for preparing organic polyhydroxy compounds which comprises heating a mixture of formaldehyde, carbon monoxide, hydrogen and a reduced cobalt oxide hydrogenation catalyst under a pressure in excess of 100 atmospheres at a temperature within the range of 80° to 300° C., the initial molar ratio of carbon monoxide to hydrogen being from 1:2 to 1:4, the sole catalyst present being the said hydrogenation catalyst, and thereafter separating organic polyhydroxy compounds from the resulting reaction product.

2. A process for preparing organic polyhydroxy compounds which comprises heating formaldehyde with carbon monoxide and hydrogen, the initial molar ratio of carbon monoxide to hydrogen being from 1:2 to 1:4, in the presence of a reduced cobalt oxide hydrogenation catalyst as the sole catalytic agent, under a pressure in excess of 100 atmospheres at a temperature within the range of 80° to 300° C., subjecting the resultant product to the action of hydrogen at superatmospheric pressure in the presence of a hydrogenating catalyst, and separating polyhydroxy compounds from the resultant reaction product.

3. A process for preparing organic polyhydroxy compounds which comprises heating a mixture of formaldehyde, carbon monoxide, hydrogen and a catalyst of the class consisting of metallic cobalt, reduced cobalt oxide, cobalt carbonyl and cobalt salts under a pressure in excess of 100 atmospheres at a temperature within the range of 80° to 300° C., the initial molar ratio of carbon monoxide to hydrogen being from 4:1 to 1:10, the said catalyst being the sole catalyst present, and thereafter separating organic polyhydroxy compounds from the resulting reaction product.

4. A process for preparing organic polyhydroxy compounds which comprises heating a mixture of formaldehyde, carbon monoxide, hydrogen and a catalyst of the class consisting of metallic cobalt, reduced cobalt oxide, cobalt carbonyl and cobalt salts under a pressure in excess of 100 atmospheres at a temperature within the range of 80° to 300° C., the initial molar ratio of carbon monoxide to hydrogen being from 1:2 to 1:4, the said catalyst being the sole catalyst present, subjecting the resulting product to the action of hydrogen at superatmospheric pressure in the presence of a hydrogenating catalyst and separating polyhydroxy compounds from the resultant reaction product.

5. A process for preparing organic polyhydroxy compounds which comprises heating a mixture of formaldehyde, carbon monoxide, hydrogen, and a catalyst of the class consisting of metallic cobalt, reduced cobalt oxide, cobalt carbonyl and cobalt salts under a pressure in the range of 200 to 1500 atmospheres at a temperature within the range of 100° to 200° C., the initial molar ratio of carbon monoxide to hydrogen being 1:2 to 1:4, the said catalyst being the sole catalyst present, and thereafter separating organic polyhydroxy compounds from the resulting reaction product.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,950,027 | Green et al. | Mar. 6, 1934 |
| 2,094,611 | Lazier | Oct. 5, 1937 |
| 2,152,852 | Loder | Apr. 4, 1939 |
| 2,153,064 | Larson | Apr. 4, 1939 |
| 2,316,564 | Cockerill | Apr. 13, 1943 |